United States Patent Office 3,458,281
Patented July 29, 1969

3,458,281
MANUFACTURE OF PHOSPHOROUS ACID
Michel Charles Demarcq, Lyon, France, assignor, by mesne assignments, to Ugine Kuhlmann (Societe Anonyme), Paris, France, a French corporation
No Drawing. Filed Mar. 7, 1966, Ser. No. 532,115
Claims priority, application France, Mar. 8, 1965, 8,329
Int. Cl. C01b 25/16
U.S. Cl. 23—165                     8 Claims

ABSTRACT OF THE DISCLOSURE

A method for the production of phosphorous acid substantially free of phosphorus acids having a degree of oxidation higher than that of phosphorous acid which comprises the steps of (a) reacting phosphorus trichloride with from 3 to 6 moles per mole of phosphorus trichloride of a hydroxylated compound having the formula

ROH wherein R represents a member selected from the group consisting of alkyl, chloroalkyl, hydroxyalkyl, alkoxyalkyl phenyl, alkylphenyl, alkoxyphenyl and chlorophenyl at a temperature between −30° C. and the boiling temperature of said hydroxylated compound, whereby a mixture containing phosphorous esters and phosphoric esters is obtained, (b) hydrolyzing said mixture with water at a temperature of between 20° C. and 100° C. until said phosphorous esters are completely hydrolyzed without substantially hydrolyzing said phosphoric esters, whereby a mixture of phosphorous acid, phosphoric esters and volatile constituents is obtained, (c) separating said phosphoric acid from said mixture and (d) recovering phosphorous acid substantially free of phosphorus acids having a degree of oxidation higher than that of phosphorous acid.

---

The present invention relates to the manufacture of phosphorous acid and more particularly of phosphorous acid which is substantially free from phosphorus acids having a higher degree of oxidation.

The term phosphorus acids having a higher degree of oxidation as used herein essentially means orthophosphoric acid (I) but also condensed acids such as hypophosphoric acid (II) and isohypophosphoric acid (III) and pyrophosphoric acid (IV);

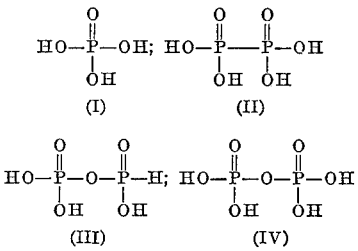

However, said condensed acids have a low stability in acidic media, in which they are converted through hydrolysis either as concerns hypophosphoric acid (II) and isohypophosphoric acid (III) into phosphorous acid and phosphoric acid or as concerns pyrophosphoric acid (IV) into phosphoric acid alone, and they generally have a short life in concentrated phosphorous acid solutions.

The conventional method for the manufacture of phosphorous acid comprises hydrolyzing phosphorus trichloride according to the diagrammatically simplified reaction:

(1) $\quad PCl_3 + 3H_2O \rightarrow H_3PO_3 + 3HCl$ and evaporating the excess water and the hydrogen chloride which are formed.

Actually traces of phosphorus compounds other than phosphorous acid, including phosphoric acid are also formed in the course of said hydrolysis. The two main sources of said compounds are:

(a) The lack of purity of the phosphorus trichloride used in which traces of phosphorus oxychloride and phosphorus pentachloride evidently lead to the formation of phosphoric acid in the course of the hydrolysis;

(b) The spontaneous dismutation of nascent phosphorous acid, which leads on one hand to superoxidized phosphorus acids (orthophosphoric, hypophosphoric, isohypophosphoric, pyrophosphoric acids) and on the other to underoxidized derivatives (hypophosphorous acids, phosphine etc. . . .).

It is possible to remedy the lack of purity of the initial phosphorus trichloride by using only a freshly prepared and perfectly rectified phosphorus trichloride. On the other hand, the spontaneous dismutation of nascent phosphorous acid is practically impossible to avoid even when hydrolysis is carried out in iced water and in the complete absence of oxygen.

In practice the phosphoric acid contents may, in commercial phosphorous acids, be 1 to 3% of the dry weight of the substance.

In a number of uses the presence of a small quantity of phosphoric acid is not detrimental. To the contrary, in other uses where high degree of purity is required, the conventional commercial phosphorous acid cannot be used.

An object of the present invention is to provide a method for the manufacture of phosphorous acid capable of being used in reactions in which a high degree of purity is required.

A further object of the invention is to provide for the obtention of phosphorous acid free from phosphorus acids of a higher degree having oxidation, which contain for instance not more than .01 to 0.5% of phosphoric acid.

A further object of the invention is to provide mixtures of phosphorous acid and small quantities of esters of phosphorus acids having a degree of oxidation higher than that of phosphorous acid, which are substantially free from free phosphorus acids of the said type, which mixtures are obtained in the course of the manufacture of the pure phosphorous acid.

The method according to the invention essentially consists in reacting phosphorus trichloride and an alcohol or phenol of the formula ROH, in which R is an alkyl or aryl radical which may be chloro-substituted, while maintaining the temperature of the reaction mixture at a value which is at most equal to that of the boiling point of said alcohol or phenol, thereby obtaining a mixture of phosphorous esters, hydrogen chloride and possibly alkyl chloride, submitting the mixture to the action of water in order to completely hydrolyze said phosphorous esters without substantially hydrolyzing the said phosphoric esters, and separating the phosphorous acid resulting from said hydrolysis from the accompanying volatile components and phosphoric esters.

The separation of phosphorous acid may be conducted by evaporation to dryness of the mixture resulting from the hydrolysis, whereby a residue, essentially formed of phosphorous acid containing a small quantity of neutral or acid phosphoric esters is obtained, the proportion of said esters in said residue generally being from 1 to 5% of the dry mixture. After which, said residue is freed from the phosphoric esters contained therein, by distillation under high vacuum or preferably by agitation with an organic solvent which does not dissolve phosphorous acid and/or aqueous solutions thereof, but does dissolve the phosphoric esters.

For certain uses in which the presence of small quantities of phosphoric esters can be accepted, a final elimination of said esters may be dispensed with.

In short, the method according to the invention comprises in the more general aspect thereof the four following steps:

(A) Reaction of phosphorus trichloride with an alcohol or phenol.

(B) Hydrolysis of only the phosphorous esters resulting from the above reaction.

(C) Evaporation of the mixture resulting from said hydrolysis.

(D) Elimination of phosphoric esters from the residue of said evaporation.

Step (A) is carried out by mixing the reactants with strong stirring, and cooling. As hereinabove described said step leads to a mixture of phosphorous esters, hydrogen chloride, and, when ROH is an alcohol, to a certain proportion of alkyl chloride RCl.

The phosphorous esters which are formed by said reaction, when ROH is an alcohol, include a major proportion of dialkyl phosphites $(RO)_2POH$ with a variable proportion of monoalkyl phosphites, and, exceptionally, trialkyl phosphites; when ROH is a phenol triaryl phosphites are essentially formed, which may however contain traces of di- and monoaryl phosphites.

In the general case, the reaction may be written as follows:

(2) $PCl_3 + 3ROH \rightarrow x(RO)_3P + y(RO)_2POH$
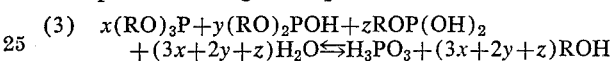

where $x+y+z=1$.

In the same manner as phosphorus trichloride reacted with water yields phosphorus acids other than phosphorous acid, including phosphoric acid, it has been found that the action of alcohols and phenols according to reaction (2) led to the formation of a small quantity of esters of phosphorus acids other than those of phosphorous acid, and more particularly to neutral or acid phosphoric esters.

The alcohol or phenol used according to the invention is preferably but not limited to compounds selected from the group comprising methanol, ethanol, propanol, isopropanol primary n-butanol, sec. butanol, isobutanol, commercial amylic alcohols, hexanol, chloroethanol; diols such as ethanediol, propanediols and butanediols and monoethers thereof; phenol, p-cresol, m-cresol, o-cresol, xylenols, ethylphenols and higher alkylphenols, chlorophenols, anisol and the like. The mixture of two or more of the above mentioned alcohols or phenols, or of said alcohols or phenols with water or nonhydroxylated solvents such as for example aliphatic or aromatic hydrocarbons, possibly chlorinated, ethers, esters and the like may also be used.

The required quantity of alcohol or phenol may be 3 to 6 moles, and more particularly 3.3 to 4.5 moles per mole of phosphorus trichloride.

The alcohol or phenol is preferably deaerated before use, under vacuum or by boiling at atmospheric pressure or by bubbling of an inert gas therethrough.

The reaction temperature may be between $-30°$ C. and the boiling temperature of the alcohol or phenol used, the preferred range being from $+10$ to $+50°$ C. for alcohols and $+40$ to $+180°$ C. for phenols.

The reaction may take place at atmospheric pressure or at pressures higher or lower than atmospheric pressure. Operating under lower pressure has the advantage of enhancing the evacuation of the hydrogen chloride and possibly the alkyl chloride, RCl, formed in the course of the reaction (2). It also makes it possible, while maintaining a relatively low temperature, to cause the reaction mixture to boil, thereby creating a further agitation. Furthermore the reaction heat may, in case of an exothermic reaction, be eliminated not by cooling the reactor but by condensing the vapors of volatile components.

In the second step (B) the mixture of esters obtained in step (A) from which the hydrogen chloride and the alkyl chloride, RCl, may preferably or may not be previously separated by moderate heating under vacuum or by a flow of inert gas is, as hereinabove mentioned, submitted to the action of water in such a manner that the phosphorous esters are completely hydrolyzed, which takes place according to the partial reversible reaction:

(3) $x(RO)_3P + y(RO)_2POH + zROP(OH)_2$
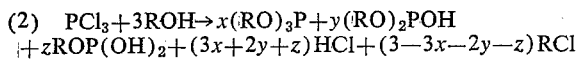

without substantially hydrolyzing the phosphoric esters, which are much more resistant to hydrolysis.

Said hydrolysis is preferably carried out between 20 and 100° C. with cooling since reaction (3) is exothermic, with or without stirring. The reaction may in certain cases be advantageously catalysed by a trace of hydrogen chloride.

The quantity of water used for said hydrolysis may be between 1 and 20 times the theoretical quantity corresponding to Equation 3.

When the alcohol or phenol has a lower boiling temperature than that of water or forms with water a homo- or heteroazeotrope having a lower boling point than water, it may be advantageous to distill off the freed alcohol or phenol as it forms with possibly part of the free water, in order to shift the semiequilibrium (3) towards the right. Total hydrolysis is thus reached more rapidly, with a reduced water consumption. To this effect a reactor may be used, equipped with a plate or packed column and operating under atmospheric pressure or under vacuum.

The water may also be introduced in successive portions and the freed alcohol or phenol distilled off possibly with part of the free water before each new addition of water, or again introduced while simultaneously distilling off the alcohol or phenol in a completely continuous operation.

Finally, it may be advantageous to start the hydrolysis during step (a) by intentionally introducing a certain quantity of water at the same time as the alcohol or phenol, ROH. Such a method of operation generally reduces the quantity of alkyl chloride, RCl, which is formed.

The evaporation to dryness carried out in step (C) of the mixture resulting from hydrolysis (B), which may contain the alcohol or phenol, ROH, the alkyl chloride, R—Cl, water in excess and hydrogen chloride as volatile constituents, is preferably operated under vacuum at a temperature not exceeding 140° C.

The residue thus obtained essentially comprises phosphorous acid containing only traces (generally less than .3%) of free phosphoric acid and a somewhat higher proportion (up to 5%) of neutral or acid phosphoric esters.

The method consisting in stirring the raw phosphorus acid obtained in step (C) with an organic solvent such as hereinabove defined is the more general and the more efficient for carrying out step (D). Such a washing may be applied either to the molten anhydrous phosphorous acid, or to a concentrated aqueous solution thereof. The organic solvent is advantageously but not limitatively selected from the group comprising hydrocarbons such as hexane, heptane, benzene, toluene, xylene, ethyl benzene, cumene etc. . . .; chlorinated solvents such as dichloromethane, chloroform, tetrachloromethane, dichloroethane, tetrachloroethane, dichloroethylene, trichloroethylene, tetrachloroethylene, chloropropanes, dichloropropanes, chlorobutanes, chloropentanes, chlorohexanes, mono- or polychlorobenzenes etc. . . .; alcohols, such as butanols, pentanols, hexanols; etheroxides such as ethyl oxide, isopropyl oxide, butyl oxide, glycol monobutyl ether; esters such as ethyl, propyl, butyl, amyl or hexyl acetates; phenols such as phenol, p-, m- or o-cresols; xylenols; chlorophenols, and the like. Mixtures of two or more of such solvents may also be used.

The washed layer of phosphorous acid is then decanted, freed from traces of organic solvent by heating under vacuum or distillation in steam, then filtered with or without addition of active carbon or bleaching earth, possibly after adding water to bring it to the suitable concentration.

The solvent layer containing the phosphoric esters may be recovered either by distillation or by reacting with an aqueous or hydroalcoholic solution of a strong alkaline agent such as sodium, potassium or calcium hydroxide, litharge, sodium carbonate, sodium triphosphate etc. . . . thereby at least partially saponifying the phosphoric esters and converting said esters to salts which are insoluble in the solvent or water extractible.

According to a modification the washing solvent may be introduced earlier, for example during or immediately after one of steps (A) or (B), in such a quantity that the mixture obtained at the end of step (B) separates in two layers, one containing the essential part of the phosphorous acid and very little phosphoric esters, and the other the essential part of the phosphoric esters and very little phosphorous acid. In this case, step (C) is omitted, as well as the first part of step (D) which is then limited to the final stage of recovery from the two layers obtained, of the phosphorous acid on one hand and the washing solvent, the alcohol or phenol, ROH, and the alkyl chloride, R—Cl, when present, on the other.

One particular case of the above described modification, in which the washing solvent may be dispensed with is that in which the alcohol or phenol ROH forms, alone or in admixture with the alkyl chloride, RCl, a phase of limited miscibility with the aqueous solution of phosphorus acid obtained at the end of step (B).

Finally when the presence of small quantities of phosphoric esters in the phosphorous acid is considered as acceptable and when step (D) is omitted the raw phosphorous acid obtained at the end of step (C) may be used as such or in aqueous solution, after filtration with or without addition of active carbon or bleaching earth if desired.

The following examples are illustrative of various embodiments of the invention.

EXAMPLE 1

275 g. of rectified phosphorus trichloride were introduced dropwise over a period of 35 minutes in 230 g. of deaerated pure methanol with continuous stirring, the reaction vessel being cooled externally so that the temperature remains between 25 and 35° C. When all the phosphorus trichloride was introduced, dry nitrogen was bubbled therethrough during 30 minutes, after which 250 g. of deaerated distilled water were poured into the mixture while stirring and maintaining the temperature below 50° C. The mixture was left at rest overnight. Thereafter the volatile constituents were distilled off under a pressure of 20 mm. Hg, without the temperature being raised above 110° C., and the residue was steam distilled under the same vacuum over a period of one hour at a temperature of 100–110° C. 159.8 g. of anhydrous phosphorous acid were finally obtained, titrating .14% $R_3PO_4$ and 1.24% $OCH_3$.

EXAMPLE 2

134 g. of rectified phosphorus trichloride were introduced little by little into 112 g. of deaerated pure methanol, with continuous stirring, the temperature being maintained at 30–40° C. After expelling the excess methanol and the methyl chloride and hydrogen chloride which were formed, under a pressure of 22 mm. Hg without letting the temperature of the condensed vapors rise over 30° C., the residue was stirred with 100 g. of deaerated, distilled water during 15 minutes, whereafter the volatile constituents, i.e., water and methanol were distilled off under a pressure of about 200 mm. Hg without heating above 105° C. This hydrolysis treatment was repeated twice more. The phosphorous acid residue was dissolved in an equal weight of deaerated, distilled water, then stirred with 150 ml. methylene chloride for 30 minutes. The decanted, aqueous layer was evaporated to dryness under a pressure of 20 mm. Hg without heating above 110° C. 73 g. of phosphorous acid were obtained, titrating .32% $H_3PO_4$ and .2% $OCH_3$.

EXAMPLE 3

275 g. of rectified phosphorus trichloride were poured, over a period of 45 minutes, in 349 g. of 95.6% of previously degased aqueous ethyl alcohol, while maintaining a temperature of 25 to 35° and continuous stirring. After one hour of rest, dry nitrogen was bubbled therethrough during 13 minutes. Thereafter 350 g. of deaerated distilled water were introduced while maintaining a temperature of about 40° C. After resting over night, the mixture was distilled under a pressure of 16 mm. Hg without heating over 110° C. A residue of raw phosphorous acid was obtained, weighing 167 g. The said residue was dissolved in the same weight of deaerated distilled water, stirred twice during 1 hour each time with 167 g. of 1,2-dichloro-ethane. The aqueous layer obtained, after evaporation under 19 mm. Hg at 110° C., yielded 161 g. of phosphorous acid titrating .29% $H_3PO_4$ and .40% $OC_2H_5$.

EXAMPLE 4

137.5 g. of rectified phosphorus trichloride were poured dropwise with constant stirring in 266 g. of pure n-butanol while maintaining the temperature at 30–40° C. After resting overnight, 200 g. of deaerated distilled water were added and the mixture stirred during 4 hours at 80° C. The homogeneous solution thus obtained was added to 50 g. water, which led to separating the mixture in two layers, i.e., a lower aqueous layer and an upper butanolic layer. The lower aqeuous layer was drawn off and after evaporation under 20 mm. Hg at 110° C., left a residue of 34.4 g. anhydrous phosphorous acid titrating .38% $H_3PO_4$ and .22% $OC_4H_9$.

The remaining butanolic layer was stirred four times during 2 hours at 80° C., each time with 100 ml. of a normal aqueous solution of hydrogen chloride. Successive quantities of 28.2 g., 12.5 g., 4.8 g., and 1.3 g. of anhydrous phosphorous acid with an average content of .38% $H_3PO_4$ were thus further recovered by evaporation of the aqueous layers drawn off after each treatment.

The evaporation of the remaining butanolic layer left a residue of 3 g. which after being dissolved in benzene and washed 5 times with 10 g. water (which led to a further recovery of .5 g. phosphorous acid) then again evaporated, left 2.49 g. of an oily product essentially formed of a mixture of mono-, di-, and tributyl-phosphates with molar ratios, 3.7/71.5/7/24.8.

EXAMPLE 5

137.5 g. of rectified phosphorus trichloride were poured, over a period of 35 minutes in 343 g. of OXO amylic alcohol, vigourously stirred with 18 g. of water and cooled so that the temperature could not rise over 35° C. The resulting mixture was submitted to the following successive washings, each comprising a stirring period of 30 mintes at the temperature indicated, followed by decantation at 22–23° C. Thereafter the aqueous lower layer was drawn off and evaporated under 20 mm. Hg at 110° C.

| Washing with— | Temperature (° C.) | $H_3PO_3$ obtained (g.) |
|---|---|---|
| 250 ml. water | 80 | 12.0 |
| 100 ml. aqueous HCl 0.6 N | 80 | 22.3 |
| 100 ml. aqueous HCl 0.6 N | 80 | 17.7 |
| 100 ml. aqueous HCl 0.6 N | 80 | 11.0 |
| 4 times 100 ml. water | 23 | 12.4 |
| Total (92% of theory) | | 75.4 |

The first four portions of phosphorous acid were gathered and submitted to steam distillation at 110° C. under 20 mm. Hg during 1 hour, which left an odorless and colorless, anhydrous phosphorous acid, titrating .19% $H_3PO_4$ and .26% $OC_5H_{11}$.

The remaining organic layer, distilled under vacuum yielded:

(a) A residue weighing 10.3 g. formed of 0.6 g. phosphorous acid and 9.7 g. of a mixture of mono-, di-, and triamyl phosphates with molar ratios 0.62/6.67/2.7.

(b) A distillate weighing 318 g., comprising 273 g. of amylic alcohol, 17 g. amyl chloride and 28 g. of water.

EXAMPLE 6

275 g. of rectified phosphorus trichloride were slowly poured, over a period of 45 minutes in 860 g. of anhydrous phenol while continuously stirring and maintaining a temperature of about 60° C. The temperature was then raised to 140° C. over a period of 50 minutes, then maintained at this value during 6 hours and a half. The raw triphenyl phosphite obtained contained 18.1% of combined phosphorous acid and 0.7% chlorine.

500 g. of said phosphite were stirred with 244 g. water during 30 minutes while cooling so that the temperature could not rise over 34° C. After cooling at 22.3° C. and decanting, a lower layer was drawn off, formed of an aqueous fraction weighing 179 g. which was evaporated under 19 mm. Hg at a maximum temperature of 100° C. The residue was submitted to steam distillation during 1 hour at 110° C. under 20 mm. Hg. 68.7 g. (yield: 76%) of odorless, colorless, anhydrous phosphorous acid were obtained, titrating .15% $H_3PO_4$.

Two other washings operated in the same conditions but at room temperature on the organic phase with 227 and 245 g. of water, successively, yielded 196 and 256 g., respectively, of aqueous phases (decanting as upper layers), the first of which contained 15.0 g. (yield: 16.6%), and the second 4.5 g. (yield: 5%) of phosphorous acid.

The remaining phase formed of water saturated phenol weighed 610 g. and contained only 2.14 g. of unrecovered phosphorous acid.

EXAMPLE 7

137.5 g. of phosphorous trichloride were poured over a period of 35 minutes in 402 g. of anhydrous xylenol (boiling range: 212–226° C.) while continuously stirring and maintaining a temperature of about 40° C. The temperature was then raised to 150° C. within 2 hours, and maintained at this value during 10½ hours while a slight flow of dry nitrogen was bubbled through the liquid. The resulting product, essentially formed of trixylenyl phosphite containing excess xylenol, was a light yellow oil weighing 420 g. and containing 18.35% of combined phosphorous acid, and .10% chlorine.

150 g. of said phosphite were caused to boil with 50 g. of water during 30 minutes. After cooling at 22° C. and decanting, the lower layer was drawn off, being an aqueous fraction weighing 49.35 g. This fraction was evaporated under 18 mm. Hg without exceeding a temperature of 100° C. The residue was submitted to steam distillation during 1 hour at 110° C. under 20 mm. Hg. 25.85 g. (yield: 94%) of odorless, colorless anhydrous phosphorous acid were obtained, titrating .04% $H_3PO_4$.

A second washing at room temperature operated on the organic phase with 50 g. of water led to the recovery, as lower layer, of an aqueous fraction weighing 47 g. and containing 1.75 g. of phosphorous acid.

I claim:

1. A method for the production of phosphorous acid substantially free of phosphorus acids having a degree of oxidation higher than that of phosphorous acid which consists of the steps of (a) reacting phosphorus trichloride with from 3 to 6 moles per mole of phosphorous trichoride of a hydroxylated compound having the formula

ROH wherein R represents a member selected from the group consisting of alkyl, chloroalkyl, hydroxyalkyl, alkoxyalkyl, phenyl, alkylphenyls, alkoxyphenyls and chlorophenyls at a temperature between −30° C. and the boiling temperature of said hydroxylated compound, whereby a mixture containing phosphorous esters and phosphoric esters is obtained, (b) hydrolyzing said mixture with water at a temperature of between 20° C. and 100° C. until said phosphorous esters are completely hydrolyzed without substantially hydrolyzing said phosphoric esters, whereby a mixture of phosphorous acid, phosphoric esters and volatile constituents is obtained, (c) separating said phosphorous acid from said mixture and (d) recovering phosphorous acid substantially free of phosphorus acids having a degree of oxidation higher than that of phosphorous acid.

2. The method of claim 1 step (a) wherein said hydroxylated compound is reacted in an amount of from 3.3 to 4.5 moles per mole of phosphorous trichloride.

3. The method of claim 1 step (a) wherein said hydroxylated compound is a lower alkanol and the reaction temperature was maintained sufficiently high whereby volatile reaction products distill from the reaction.

4. The method of claim 1, step (b) wherein said hydroxylated compound has a boiling point below that of said water and said hydrolysis step is conducted at a temperature above the boiling point of said hydroxylated compound, whereby most of the volatile reaction constitutents distill from the reaction.

5. The method of claim 1, step (c) wherein said phosphorous acid is separated from said mixture by extracting said mixture with a selective solvent which is not miscible with phosphorous acid.

6. The method of claim 5 wherein said selective solvent is a chlorinated solvent.

7. The method of claim 5 wherein said selective solvent is said hydroxylated compound.

8. A method of the production of phosphorous acid substantially free of phosphorous acids having a higher degree of oxidation than that of phosphorous acid and containing small quantities of phosphoric esters which consists of the steps of (a) reacting phosphorus trichloride with from 3 to 6 moles per mole of phosphorus trichloride of a hydroxylated compound having the formula

ROH wherein R represents a member selected from the group consisting of alkyl, chloroalkyl, hydroxyalkyl, alkoxyalkyl, phenyl, alkylphenyls, alkoxyphenyls and chlorophenyls at a temperature between −30° C. and the boiling temperature of said hydroxylated compound, whereby a mixture containing phosphorous esters and phosphoric esters is obtained, (b) hydrolyzing said mixture with water at a temperature of between 20° C. and 100° C. until said phosphorous esters are completely hydrolyzed without substantially hydrolyzing said phosphoric esters, whereby a mixture of phosphorous acid, phosphoric esters and volatile constituents is obtained, (c) evaporating said mixture to separate said volatile constituents and (d) recovering phosphorous acid substantially free of phosphorous acids having a higher degree of oxidation than that of phosphorous acid and containing small quantities of phosphoric esters.

References Cited

UNITED STATES PATENTS

| | | | |
|---|---|---|---|
| 1,838,431 | 12/1931 | Milligan | 23—165 |
| 1,936,985 | 11/1933 | Pommel et al. | 260—98 |

OTHER REFERENCES

Van Wazer: Phosphorus and its Compounds, vol. 1, pp. 372–373 relied on (1958).

Bailar: Editor, Inorganic Synthesis, vol. IV, 1953; Voigt et al.: pp. 55–57 relied on; Malowan: pp. 58–62 relied on.

Gerrard et al.: Journ. Chem. So. (London), 1953, pp. 1920–1922 relied on.

HERBERT T. CARTER, Primary Examiner

U.S. Cl. X.R.

23—154; 260—976